(12) United States Patent
Miller

(10) Patent No.: US 6,725,686 B2
(45) Date of Patent: Apr. 27, 2004

(54) METHOD AND APPARATUS FOR FREEZING PRODUCTS

(75) Inventor: Jeremy P. Miller, Mortimer (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/262,396

(22) Filed: Sep. 30, 2002

(65) Prior Publication Data

US 2003/0074904 A1 Apr. 24, 2003

(30) Foreign Application Priority Data

Sep. 28, 2001 (GB) ............................................. 0123336

(51) Int. Cl.⁷ ............................................. F25D 25/04
(52) U.S. Cl. ........................................... 62/374; 62/380
(58) Field of Search ............................... 62/63, 374, 380

(56) References Cited

U.S. PATENT DOCUMENTS

| | | | | |
|---|---|---|---|---|
| 3,791,162 A | * | 2/1974 | Baker ........................... | 62/341 |
| 3,844,135 A | | 10/1974 | Zamiara ........................ | 62/375 |
| 4,128,164 A | * | 12/1978 | Sandberg ..................... | 198/813 |
| 4,852,358 A | * | 8/1989 | Acharya et al. ................ | 62/63 |
| 4,858,445 A | * | 8/1989 | Rasovich ...................... | 62/374 |
| 4,881,379 A | * | 11/1989 | Sakai ........................... | 62/380 |
| 4,955,209 A | * | 9/1990 | Smith ........................... | 62/380 |
| 5,220,803 A | * | 6/1993 | Kiczek .......................... | 62/63 |
| 5,509,277 A | * | 4/1996 | Kiczek et al. ................. | 62/374 |
| 5,816,067 A | | 10/1998 | Cloarec ........................ | 62/374 |
| 5,860,282 A | * | 1/1999 | Liberman et al. .............. | 62/63 |
| 6,009,719 A | | 1/2000 | Ochs ............................ | 62/380 |

FOREIGN PATENT DOCUMENTS

EP 0728995 8/1996 ............. F25D/3/11

* cited by examiner

Primary Examiner—William E. Tapolcai
(74) Attorney, Agent, or Firm—Robert J. Wolff

(57) ABSTRACT

A tunnel freezer having a metal belt for carrying product therethrough, wherein the weight of said belt is from 1 kg per square meter of surface area to 6 kg per square meter of surface area.

5 Claims, 3 Drawing Sheets

METHOD AND APPARATUS FOR FREEZING PRODUCTS

FIELD OF THE INVENTION

This invention relates to a method and apparatus for freezing products and, more particularly but not exclusively, is concerned with a method and apparatus for freezing foodstuffs.

BACKGROUND OF THE INVENTION

The use of liquid nitrogen to freeze foodstuffs has increased dramatically over the past 30 years. The improvement in the quality of the frozen food is well known. However, whilst liquid nitrogen is now used for freezing premium food products its cost prevents it being used for freezing those foodstuffs which do not command a premium price. These foodstuffs are typically frozen using mechanical refrigeration.

Over the years many attempts have been made to reduce the quantity of liquid nitrogen required to freeze a given foodstuff and gradually it has become economically viable to use liquid nitrogen to freeze an increasing range of foodstuffs.

The present invention aims to continue this trend. In particular, in existing cryogenic tunnel freezers the food is carried through the freezer on belts which are normally made of stainless steel. These belts typically weigh from 8 kg per square meter of surface area to 19 kg per square meter of surface area according to the products being frozen. Typically, the smaller the product the higher the weight per square meter of surface area because of the need to provide a small mesh to inhibit the product falling through the belt.

The belts are normally made of metal since metal detectors are normally positioned downstream of tunnel freezers and it is very easy to detect whether any metal from the belt, or elsewhere in the tunnel freezer accidentally enters a product. Belts of plastics material have been used but their use has generally been discontinued because plastics materials tend to become embrittled at low temperatures and there is no practical method of detecting small fragments of plastics material in the frozen product.

The present invention is based on the observation that the weight per square meter of surface area of a metal belt can have a profound effect on the consumption of liquid nitrogen, particularly as the belt speed increases.

SUMMARY OF THE INVENTION

According to one aspect of the present invention there is provided a tunnel freezer having a metal belt for carrying product therethrough, characterised in that the weight of said belt is from 1 kg per square meter of surface area to 6 kg per square meter of surface area.

Preferably, said belt has a weight of from 2 kg per square meter of surface area to 4 kg per square meter of surface area.

More, preferably, said belt has a weight of from 2.2 kg per square meter of surface area to 3.1 kg per square meter of surface area.

Advantageously, said belt has a weight of from 2.6 kg per square meter of surface area to 2.9 kg per square meter of surface area.

The present invention is particularly useful in combination with those tunnel freezers which are provided with a spray bar and a tray which, in use, contains liquid cryogen and into which the laden belt sags.

The present invention also provides a method of operating a tunnel freezer having an inlet, an outlet and a belt to convey products to be frozen between said inlet and said outlet, characterized by adjusting the speed of the belt to maintain the temperature of said belt adjacent said inlet substantially constant.

There is also provided a tunnel freezer for carrying out this method, which is characterised by means to vary the speed of the belt to maintain the temperature of said belt adjacent said inlet substantially constant.

In one embodiment said means comprises a temperature sensor located at or adjacent the inlet and arranged to generate a signal indicative of the temperature of said belt adjacent the inlet of said freezing tunnel and a controller arranged to, in use, vary the speed of said belt in response to the signal received from said temperature sensor.

For a better understanding of the present invention reference will now be made, by way of example, to the accompanying drawings, in which:

DETAILED DESCRIPTION OF THE PREFERRED EMBODIMENT

Figure 1:
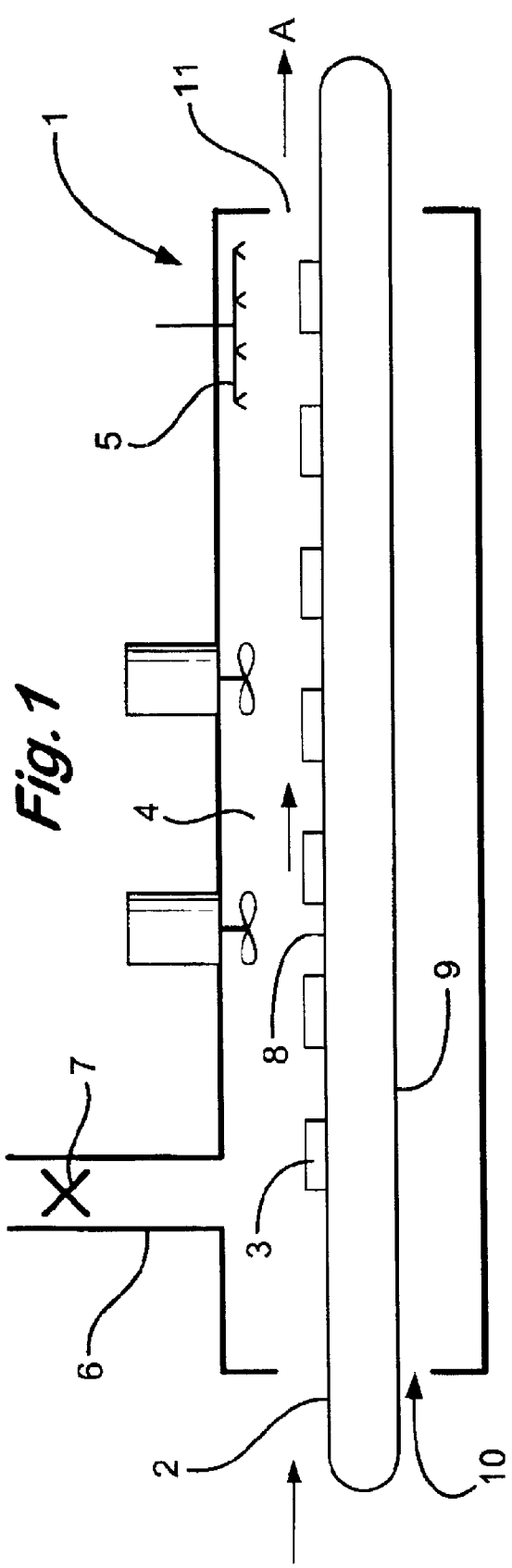
FIG. 1 is a schematic side elevation, partly in cross-section, of one embodiment of a tunnel freezer according to the present invention.

Referring to FIG. 1 there is shown a tunnel freezer which is generally identified by the reference numeral 1.

The tunnel freezer 1 comprises a belt 2 which carries products 3 to be frozen through the freezing tunnel 4 in the direction of the arrow 'A'.

As the products 3 pass through the freezing tunnel 4 they are frozen by contact with cold nitrogen which is introduced into the freezing tunnel 4 through spray bar 5 in the form of liquid at $-196°$ C., evaporates and passes through the freezing tunnel 4 in counter-current flow with the products 3 and leaves through exhaust duct 6 assisted by an exhaust fan 7.

In a modern food freezing factory it is not unusual for the tunnel freezer 1 to be used to freeze a wide range of different food products in the same day. These can vary from whole chicken, to gateau, pre-prepared meals, sauces and desserts and, indeed, we are aware of one factory where runs as short as 30 minutes are commonplace.

In order to accommodate such diverse products the speed of the belt 2 is varied according to the product. Products such as chicken and turkeys take a comparatively long time to freeze whilst thin products such as hamburgers can be frozen relatively quickly.

Over the years it has been found that the temperature of the gas leaving the freezing tunnel 4 through the exhaust duct 6 should be about $-40°$ C. There are various reasons for this. In particular, if the temperature is allowed to rise above this there is a high risk that the exhaust fan 7 will become iced up and stop working. In addition, the tunnel freezer 1 would become unduly long.

We have observed that as the speed of the belt 2 is increased the temperature in the exhaust duct 6 falls. As a consequence less of the available refrigeration is being utilised. We have traced part of this problem to the belt 2.

In particular, the belt 2 has an upper run 8 and a lower run 9. Depending on the surface area of the belt 2 covered by product 3 part of the belt 2 beneath the spray bar 5 is subject to direct contact with droplets of liquid nitrogen at −196° C.

As the belt 2 advances so this very cold area of belt 2 moves along the lower run 9 giving up its cold as it moves towards the inlet 10.

If the belt 2 is moving relatively slowly then the temperature of the belt 2 at the inlet 10 of the tunnel freezer 1 will approximate the desired temperature of the exhaust. However, as the speed of the belt 2 is increased so the temperature of the belt 2 at the inlet of the tunnel freezer 1 falls. This, in turn causes the temperature of the exhaust gas to decrease and reduces the overall efficiency of the freezing process.

We have found that this problem can be mitigated by reducing the weight per square meter of surface area of the belt 2.

Figure 2:
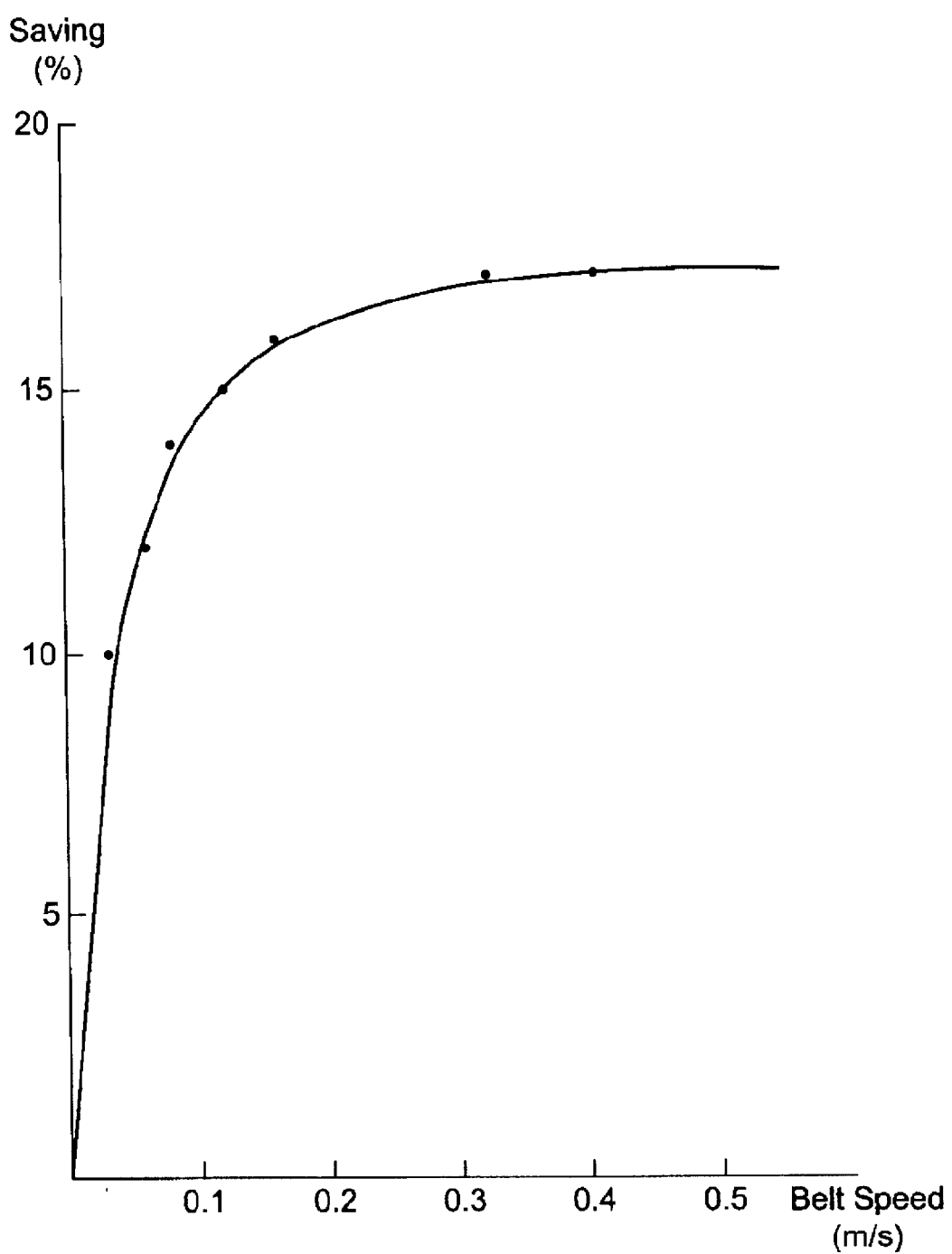
FIG. 2 is a graph showing the savings which can be achieved at various speeds of the belt.

Turning now to FIG. 2, there is shown a graph which shows how the savings of liquid nitrogen vary with the velocity of a belt having a weight of 3.28 kg per square meter of surface area compared with a conventional belt having a weight of 18.18 kg per square meter of surface area.

This graph refers to steady state running conditions and does not take into account any savings which may be made during initial cooldown.

It will be seen that a saving of approximately 10% is made at a belt speed of 0.03 m/s and this increases to 15% at a belt speed of 0.12 m/s.

As a practical matter belt speeds would not be expected to exceed 0.5 m/s.

Similarly, the weight per square meter of surface area of the belt would not be expected to be less than 1 km/m² because structural reasons.

Figure 3:
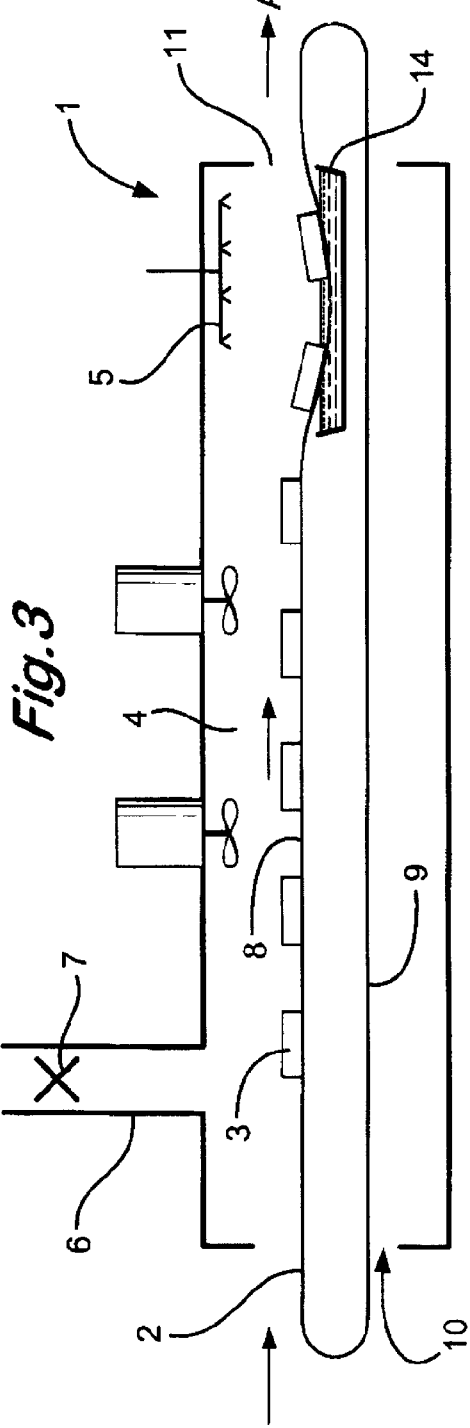
FIG. 3 is a view similar to FIG. 1, but showing a second embodiment of a tunnel freezer in accordance with the present invention.

An interesting spin off from the present invention is shown in FIG. 3. In particular, some tunnel freezers are provided with a liquid nitrogen (LIN) tray 14 below the spray bar 5. The belt 2 is allowed to sag so that the bottom of the products 3 theoretically touch the liquid nitrogen in the LIN tray 14.

This arrangement has never performed well.

This problem was most apparent in a factory which made huge (1 lb (0.37 kg)) hamburgers. Once the conventional belt (which had a weight of 18.18 kg per square meter of surface area had been replaced with a belt 2 having a weight of only 3.28 kg per square meter of surface area the hamburgers were perfectly frozen with a reduction in nitrogen consumption of 36%.

On analysis it is believed that in the prior art the conventional belt absorbed the bulk of the available refrigeration from the liquid nitrogen leaving little or none available to freeze the underside of the product. In contrast, the new belt 2 only absorbed a portion of the refrigeration available leaving substantial refrigeration available to freeze the underside of the hamburgers.

The belt 2 may typically comprise a Flat-Flex (Registered trade Mark) XT wire conveyor belt as made by the Wire Belt Company of Sittingbourne, Kent, England.

Whilst it is anticipated that the belt 2 will normally be made of stainless steel it could also be made of other metals, for example titanium.

It will be appreciated that as the weight per square meter of surface area of the belt 2 decreases so does its overall weight and strength. By way of comparison a belt for a conventional 16 m tunnel freezer has to be moved using a fork lift truck. A belt for a 16 m tunnel freezer in accordance with the present invention can be carried by two men.

Depending on the anticipated maximum load, it may be desirable to provide tunnel freezers in accordance with the present invention with more support rails underneath the belt 2 and guides above the belt 2. These will, to some extent reduce any savings in liquid nitrogen during initial cooldown.

Conventionally, belts are run at a continuous speed for the same product regardless of whether the belt is being fed at the rated capacity of the tunnel freezer or between batches.

Another aspect of the present invention proposes to reduce the belt speed if the temperature of the belt at or around the inlet 10 is lower than desired, which might occur, for example between batches or if the product was being introduced into the tunnel freezer 1 at a rate lower than expected.

Figure 4:
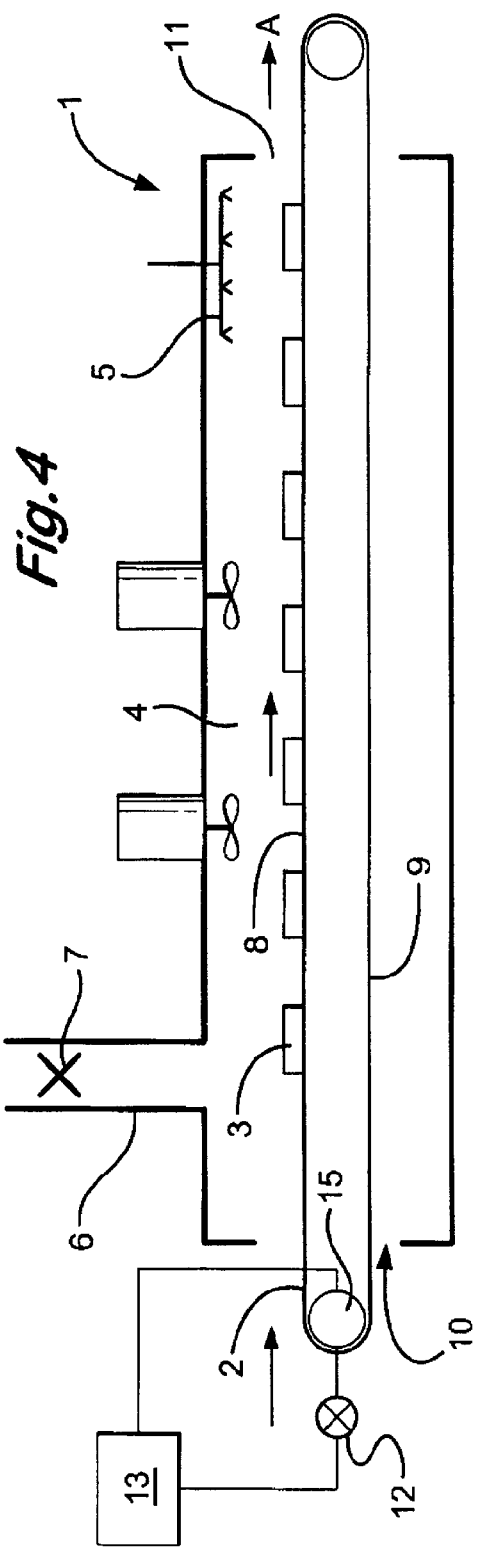
FIG. 4 is a view similar to FIG. 1, but showing a third embodiment of a tunnel freezer in accordance with the present invention

FIG. 4 shows a tunnel freezer 1 which is similar to that shown in FIG. 1 and differs therefrom only in that a temperature sensor 12 has been provided which sends a signal to a controller 13 which regulates the speed of a motor 15 which adjusts the speed of the belt 2.

Instead of the temperature sensor 12 a sensor could be used which measured the coverage of the belt 2 at the inlet 10 of the tunnel freezer 1. This would have the advantage of adjusting the speed of the belt 2 before the temperature around the inlet 10 started dropping although more programming work would be required to correlate the coverage with the speed of the belt.

It will be appreciated that this aspect of the present invention is applicable to belts regardless of their weight per square meter.

What is claimed is:

1. A tunnel freezer having a metal belt for carrying product therethrough, wherein the weight of said belt is from 1 kg per square meter of surface area to 6 kg per square meter of surface area.

2. A tunnel freezer as claimed in claim 1, wherein said belt has a weight of from 2 kg per square meter of surface area to 4 kg per square meter of surface area.

3. A tunnel freezer as claimed in claim 2, wherein said belt has a weight of from 2.2 kg per square meter of surface area to 3.1 kg per square meter of surface area.

4. A tunnel freezer as claimed in claim 3, wherein said belt has a weight of from 2.6 kg per square meter of surface area to 2.9 kg per square meter of surface area.

5. A tunnel freezer as claimed in claim 1, when provided with a tray which, in use, contains liquid cryogen and into which the laden belt sags.

* * * * *